J. WILLIAMS.
PIPE COUPLING.
APPLICATION FILED JAN. 21, 1920.
1,353,005.
Patented Sept. 14, 1920.
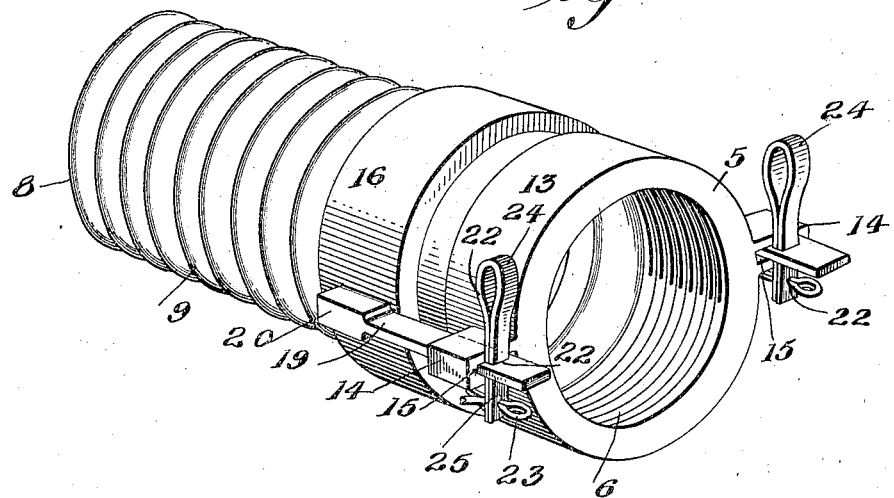
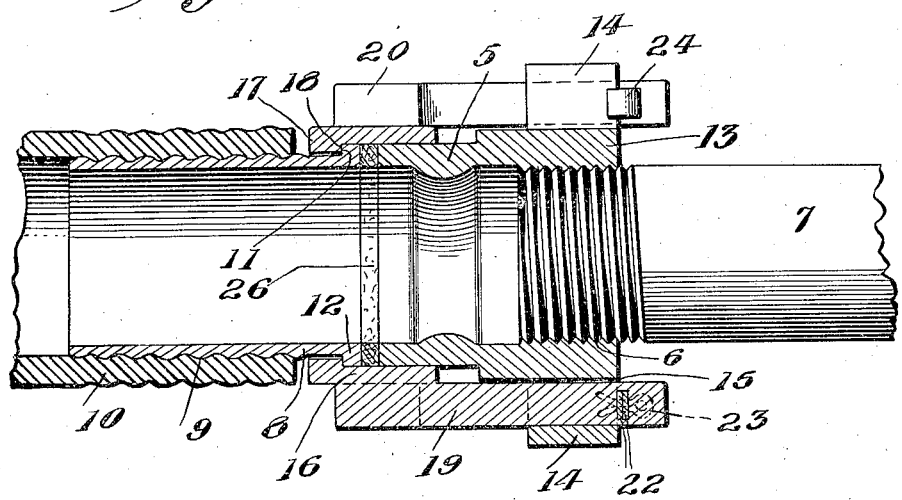
Witnesses:
Robert F. Beck
Inventor
John Williams,
By
Attorney

UNITED STATES PATENT OFFICE.

JOHN WILLIAMS, OF CLINTON, IOWA.

PIPE-COUPLING.

1,353,005.

Specification of Letters Patent.

Patented Sept. 14, 1920.

Application filed January 21, 1920. Serial No. 352,978.

*To all whom it may concern:*

Be it known that I, JOHN WILLIAMS, a citizen of the United States, residing at Clinton, in the county of Clinton and State of Iowa, have invented new and useful Improvements in Pipe-Couplings, of which the following is a specification.

This invention relates to pipe couplings of that class particularly adapted for connecting the water feed or supply pipe or conduit from the tank of an engine tender with the boiler feed or supply pipe of an engine.

The improved coupling, however, is not limited to any particular application or use, but may be interposed between pipe lengths or sections requiring a coupling of the type embodying features of the invention.

It is not unusual for a coupling between the feed or supply pipe of an engine tender and a boiler feed or supply pipe or injector of an engine to leak to such an extent as to materially waste a considerable quantity of water with disadvantages in maintaining a requisite supply for certain predetermined trips, and it is known that leaks and breakage of couplings of this character have been so serious as to permit practically all of the water to run out of the tank of the tender without knowledge of the engineer or fireman with obvious inconvenience in locomotive engineering. As well known, a flexible pipe or hose length forms part of the coupling means or connection between the water feed or supply pipe of an engine tender and a boiler feed pipe of an engine to compensate for the movements of the engine and tender during travel, and in the couplings heretofore used the said flexible pipe or hose lengths are frequently impaired or broken through adjacent to the connected extremities thereof while the remaining portions of these flexible pipe or hose lengths are unaffected and in good order for practical service. This impairment of the flexible pipe or hose lengths at the connected extremities thereof requires the removal of the same and replacement by a new length of flexible pipe or hose, and the removed injured length of pipe or hose has been usually thrown away as scrap at a material loss. The primary object of the improved pipe coupling is to insure a non-leakable joint or coupling means that is adjustable to compensate for wear and to vary the pressure engagement of the contiguous ends of the coupling members, and furthermore to so construct the several parts of the improved coupling as to reduce the tendency of the flexible pipe or hose lengths to become injured or broken through, and, furthermore to permit the use of shorter lengths of flexible pipe or hose or such lengths as may be obtained after removing or cutting off injured portions of the flexible pipe or hose lengths that may have been in use as a part of the old form or coupling with material economy in maintenance expenses.

A preferred embodiment of the improved coupling is illustrated in the accompanying drawing, and therein:

Figure 1 is a perspective view of a coupling comprising the features of the invention.

Fig. 2 is a longitudinal vertical section of the improved coupling.

This improved coupling comprises essentially a tubular coupling member 5 internally screw threaded as at 6 for attachment to the feed or supply pipe 7 leading to the injector of the boiler of an engine in the preferred application of the coupling. Associated with the member 5 is a tubular coupling member 8 exteriorly corrugated as at 9 to receive thereover one end of a flexible or hose pipe section 10 which is secured in place as usual or against accidental disengagement from the member 8 by a clamp which is well known in the art or in this particular form of couplings. The coupling member 8 is formed with a circumferential shoulder 11 by the addition thereto of a flange 12 at the coupling end, and the member 5 is enlarged or increased in thickness as at 13 from about the center thereof forwardly to the front terminal of the same. Projecting outwardly from the enlarged portion 13 of the member 5 are diametrically opposed coupling sockets 14 each having an angular slot 15 extending fully therethrough from the front edge thereof. Loosely mounted on the coupling member 8 is a clamping collar 16 which is of such width as to extend over the contiguous ends of the members 5 8 when the latter are in coupled association. The collar 16 has its rear end enlarged or thickened as at 17, and formed with a shoulder 18 adapted to abut against the shoulder 11 of the member 8. The collar 16 is provided with diametrically opposed flat arms 19 having rear enlarged extremities 20 secured to the said collar and slidably projectible through and readily separable from the sockets 14 carried by the member 5, the arms 19 being held against accidental separation or detachment from the said sockets 14 by flat spring wedges 21 which are inserted through slots 22 in the said arms 19 and engaged at their extremities by removable cotter pins 23. The wedges 21 are preferably constructed from flat spring metal strips which are doubled stress on the said arms and the collar 16 is transmitted through the engagement of the shoulders 11 and 18 respectively of the member 8 and the enlargement or thickened rear end 17 of the said collar.

From the foregoing it will be seen that the arms 19 may be connected or disconnected from the sockets 14 and furthermore that the drawing stress of the said arms 19 set up by engagement of the spring wedges 21 therewith will be equally transmitted to the member 5 through the sockets 14 and the pressure stress transmitted to the contiguous ends of the members 5 and 8 and upon the gasket 26 when the latter is used, will be uniform, with material advantages in maintaining a tight joint.

The gasket 26 is used by preference for the reason that no matter how nicely direct engaging metal edges may be ground to form a tight joint, said metal edges will always be affected by oxidation and small crevice-formations or leaking rough edges, and regrinding of these edges to maintain a tight joint is quite expensive and materially adds to the cost of repair. By adopting the gasket 26 which can be supplied at a minimum cost a more satisfactory joint is produced at a great reduction in the cost of maintenance.

The improved coupling is adapted to be used in connection with fire engine hose and water plugs as well as in water pipe lines or connections requiring separation at intervals and subsequent reattachment. The improved coupling will be also found particularly advantageous in vat supply connections.

From the foregoing it will be understood that the purpose of the improved coupling is not only to form a tight jointure means, but a device of this class that may be very quickly and effectively secured as well as readily separated by a simplified strong and durable structure.

What is claimed as new is:—

1. In a pipe coupling of the class specified, two coupling members having contiguous edges, the one member carrying a pair of diametrically opposed arms, and the other member having a pair of sockets through which the arms are inserted, and spring wedges inserted through the arms to hold the latter in the sockets.

2. In a coupling of the class specified, two coupling members having contiguous coupling edges, the one member having arms projecting therefrom and the other member provided with sockets through which the said arms movably extend, and resilient wedge means adjustably engaging the arms and separably holding said arms in connection with the sockets.

3. A coupling comprising two members with contiguous coupling edges, the one member having oppositely disposed sockets, a collar movably mounted on the remaining member to extend over the joint between the two arms and having projecting arms movably engaging the said sockets, a gasket between the contiguous ends of the said members, and spring wedges removably and adjustably inserted in the sockets.

4. A coupling of the class specified, comprising coupling members respectively having separably engaging oppositely disposed coupling arms and sockets, and resilient devices adjustably inserted through the arms to hold the latter in association with the sockets.

In testimony whereof I have hereunto set my hand in presence of the subscribing witness.

JOHN WILLIAMS.

Witness:
   CHAS. S. HYER.